United States Patent
Subbiah et al.

(10) Patent No.: US 11,556,111 B2
(45) Date of Patent: Jan. 17, 2023

(54) HUMAN-PLAUSIBLE AUTOMATED CONTROL OF AN INDUSTRIAL PROCESS

(71) Applicant: ABB Schweiz AG, Baden (CH)

(72) Inventors: Subanatarajan Subbiah, Neulussheim (DE); Benjamin Kloepper, Mannheim (DE)

(73) Assignee: ABB Schweiz AG, Baden (CH)

( * ) Notice: Subject to any disclaimer, the term of this patent is extended or adjusted under 35 U.S.C. 154(b) by 191 days.

(21) Appl. No.: 16/921,957

(22) Filed: Jul. 7, 2020

(65) Prior Publication Data
US 2021/0011459 A1    Jan. 14, 2021

(30) Foreign Application Priority Data
Jul. 8, 2019 (EP) ...................... 19184984

(51) Int. Cl.
*G05B 19/4155* (2006.01)
*G06N 20/00* (2019.01)

(52) U.S. Cl.
CPC ......... *G05B 19/4155* (2013.01); *G06N 20/00* (2019.01); *G05B 2219/31449* (2013.01)

(58) Field of Classification Search
CPC .............. G05B 19/4155; G05B 19/409; G05B 13/048; G05B 2219/31449; G06N 20/00; Y02P 80/40
See application file for complete search history.

(56) References Cited

U.S. PATENT DOCUMENTS

| | | | |
|---|---|---|---|
| 10,255,085 B1* | 4/2019 | Valsaraj | G06F 16/904 |
| 2018/0046164 A1 | 2/2018 | Drees | |
| 2020/0311597 A1* | 10/2020 | Beauchamp | G06K 9/6282 |

FOREIGN PATENT DOCUMENTS

| | | |
|---|---|---|
| CN | 1637669 A | 7/2005 |
| CN | 106796667 A | 5/2017 |

(Continued)

OTHER PUBLICATIONS

S. Ghosh, B. W. Bequette, „A Framework for the Control Room of the Future: Human-in-the-Loop MPC, IFAC PapersOnLine 51-34, Feb. 2019, 252-257.

(Continued)

*Primary Examiner* — Charles E Anya
(74) *Attorney, Agent, or Firm* — Leydig, Voit & Mayer, Ltd.

(57) ABSTRACT

A method for controlling an industrial process includes: determining, by a process controller, based at least in part on a set of current values and/or past values of state variables of the industrial process, a set of control outputs to be applied to at least one actor and/or lower-level controller configured to cause a performing of at least one physical action on the process; querying, based on at least a subset of the set of current values and/or past values of state variables and on at least a subset of the set of control outputs, a trained machine-learning model configured to output a classification value, and/or a regression value, that is indicative of a propensity of a watching human operator to at least partially override the control outputs delivered by the process controller; and determining that the classification value, the regression value, and/or the propensity, meets a predetermined criterion.

18 Claims, 5 Drawing Sheets

(56) References Cited

FOREIGN PATENT DOCUMENTS

| | | |
|---|---|---|
| CN | 107133253 A | 9/2017 |
| CN | 108317670 A | 7/2018 |

OTHER PUBLICATIONS

R. Chipalkatty, G. Droge and M. B. Egerstedt, "Less Is More: Mixed-Initiative Model-Predictive Control With Human Inputs," in IEEE Transactions on Robotics, vol. 29, No. 3, pp. 695-703, Jun. 2013, doi: 10.1109/TRO.2013.2248551.

* cited by examiner

HUMAN-PLAUSIBLE AUTOMATED CONTROL OF AN INDUSTRIAL PROCESS

CROSS-REFERENCE TO PRIOR APPLICATION

Priority is claimed to European Patent Application No. EP 19 184 984.3, filed on Jul. 8, 2019, the entire disclosure of which is hereby incorporated by reference herein.

FIELD

The invention relates to a method for automatically controlling an industrial process in a manner that appears more plausible to human operators who are watching the process as a backup.

BACKGROUND

Most of today's industrial processes are controlled in an automated manner by process control systems, such as distributed control systems. However, human operators are still watching the process as a backup. If a problematic situation arises and the automated control system is unable to cope with this situation, the human operator may override the actions proposed by the automated control system with manual actions. For example, the control system may be malfunctioning, or it may be unable to cope with the unexpected failure of a sensor or an actor.

The human operator is trained to watch the development of certain state variables of the process and take manual control in case this development appears to be not plausible to him. In this manner, the human operator ensures that the process is conducted in an orderly and safe manner, and that all constraints for the process are observed. However, each time the human operator intervenes, this comes at a price. The automated control system usually conducts the process along a trajectory in the state space that is selected according to an optimality criterion, such as saving materials or energy. If the human operator takes control, this trajectory is departed from, and the process is conducted in a less than optimal manner with respect to said optimality criterion.

It has been observed that human operators tend to take control too frequently in situations with which the automated control system would be able to cope. This causes the process to be conducted in a less than optimal manner for an overly large percentage of the time.

SUMMARY

In an embodiment, the present invention provides a method for controlling an industrial process, comprising: determining, by a process controller, based at least in part on a set of current values and/or past values of state variables of the industrial process, a set of control outputs to be applied to at least one actor and/or lower-level controller configured to cause a performing of at least one physical action on the process; querying, based on at least a subset of the set of current values and/or past values of state variables and on at least a subset of the set of control outputs, a trained machine-learning model that is configured to output a classification value, and/or a regression value, that is indicative of a propensity of a watching human operator to at least partially override the control outputs delivered by the process controller; and in response to determining that the classification value, and/or the regression value, and/or the propensity of the human operator overriding the control outputs, meets a predetermined criterion: modifying at least one of the control outputs, and/or at least one parameter that characterizes a behavior of the process controller, and/or at least one constraint under which the process controller operates, and/or conveying at least one message to the human operator, with a goal of reducing the propensity.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
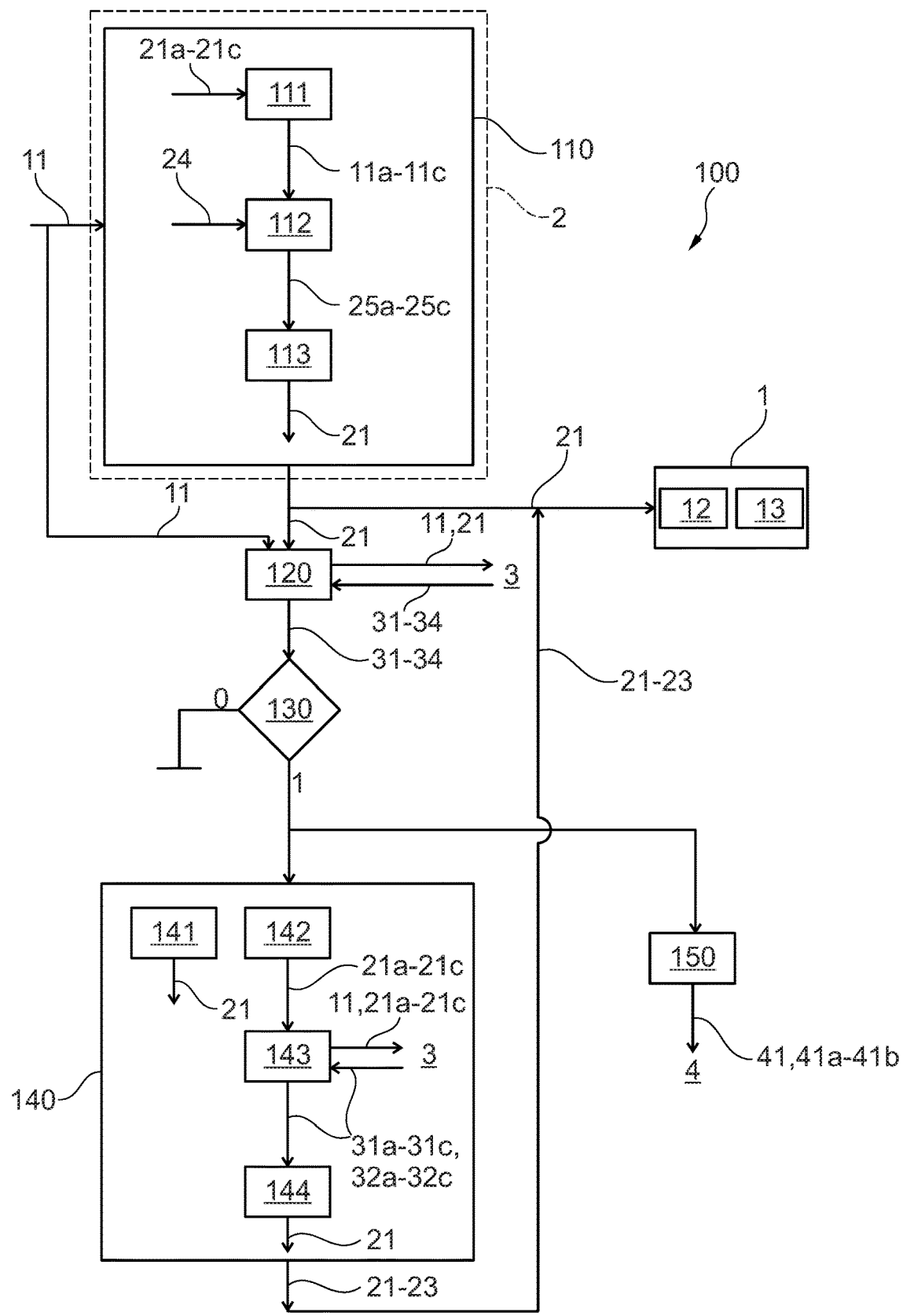
FIG. 1: Exemplary embodiment of the control method 100.

In an embodiment, the present invention provides the controlling of an industrial process in a manner that is less likely to trigger unnecessary human interventions.

In an embodiment, the present invention provides a method for controlling an industrial process, by a method for training a machine-learning model, and by corresponding software products.

The invention provides a method for controlling an industrial process. In the course of this method, a process controller gets a set of current values and/or past values of state variables of the process. For example, the values may be provided as time series data. Based at least in part on said set of values, the process controller generates a set of control outputs that are to be transformed into at least one physical action on the process. Specifically, there may be a closed feedback loop where the process controller continuously gets new values of state variables of the process. These new values are indicative of a response of the industrial process to previous physical actions caused by control outputs of the process controller.

The control outputs may be directly applied to at least one actor that in turn performs the physical action. Alternatively or in combination, the control outputs may be applied to lower-level controllers that in turn act upon such actors. For example, the control outputs may comprise a set-point (such as a desired temperature or pressure) for a lower-level controller, and the lower-level controller may control actors (such as heaters or valves) to keep a state variable of the process (such as said temperature or pressure) near this set-point.

A trained machine-learning model is queried based on at least a subset of the set of current values and on at least a subset of the set of control outputs. The trained machine-learning model is configured to output a classification value, and/or a regression value, that is indicative of a propensity of a watching human operator to at least partially override the control outputs delivered by the process controller.

In response to determining that the classification value, and/or the regression value, and/or the propensity, meets a predetermined criterion, countermeasures are taken with the goal of reducing the propensity of the human operator overriding the control outputs. For example, the criterion may comprise a threshold of the probability for an override by the human operator.

The countermeasures may comprise modifying at least one of the control outputs, and/or at least one parameter that characterizes the behavior of the process controller, and/or at least one constraint under which the process controller operates. The parameters may, for example, represent optimization goals that are being pursued with the control of the process. If the process controller itself is only available as a "black box" without knowledge of its inner workings and parameters, it is particularly advantageous to adjust at least one constraint under which the process controller operates. In this respect, the constraints may be regarded as abstract handles that mediate a manipulation of the inner workings of the process controller from the outside.

The end result of such modifications is that the physical actions that are finally selected to be applied to the industrial process appear more plausible to the human operator. I.e., these actions agree more with what the human operator expects based on his knowledge of the process, so that the human operator has less reason to suspect that anything is going wrong and manual intervention is required.

The inventors have found that while the ever-increasing complexity of process controllers causes the industrial process to be conducted in a manner that is better with respect to the given optimality criterion, it also makes it more difficult for human operators to understand the control outputs. A PID controller comprises three components that each have an easily understandable dependence on the input, namely proportional to the input itself, to an integral of the input, and to a derivative of the input, respectively. By contrast, a model predictive controller, MPC, contains a mathematical model that approximates the behavior of the process. Creating such models is a task for specialists, and the dependence of the output on the input is not straightforward from the point of view of an ordinary process operator.

In a figurative example, to conduct the process in the best manner according to the optimality criterion may not be possible in a straight-forward manner because the trajectory that the process follows in state space needs to meet constraints that may take the form of forbidden zones in state space. A complex process controller such as an MPC knows the forbidden zones by virtue of the process model and may send the process onto a circuitous trajectory in state space that circumvents the forbidden zones. But the human operator does not know that the forbidden zones in state space exist, so from his point of view, the trajectory suddenly takes a detour for no apparent reason. The modifications presented above cause the trajectory followed by the process to be less optimal, but in return for this, the trajectory contains less detours around forbidden zones.

In another example, it may be known to the human operator which constraints need to be met, but the human operator may not be confident that the strategy proposed by the MPC will actually meet the constraint. For example, if a state variable is rapidly increasing or decreasing, it is not immediately apparent to the human operator whether maximum or minimum constraints for this state variable will be met at all times. This example will be discussed in more detail further below.

The countermeasures may also comprise conveying at least one message to the human operator. For example, such message may indicate that the process controller is functional or that the components (like sensors, actors or lower-level controllers) that are involved in the control of the process have just undergone a self-test procedure and found to be functional.

Thus, conveying a message to the human operator does not change the control outputs as such to make them more plausible to the human operator. Rather, it strives to modify the understanding of the human operator, so that with this modified understanding, the unmodified control outputs appear to be plausible.

Regardless of which countermeasures are taken, individually or in combination, the end result always goes in the same direction: The probability is increased that the industrial process is conducted along a trajectory in state space that is better according to the given optimality criterion, because human-initiated deviations from such a good trajectory through worse territory in state space are minimized.

In a particularly advantageous embodiment, the classification value, and/or the regression value, comprises a likely reason for the human operator to override the control outputs delivered by the process controller. The modifications performed in the course of the countermeasures may then be specifically targeted at reducing the prevalence of this likely reason in the behavior of the process.

In a figurative example, the optimal trajectory may mandate that a pump motor is driven with a certain frequency spectrum. But when the pump motor is driven with this frequency spectrum, this may cause the pump to emit a grinding noise that is very similar to the noise that the pump emits when a bearing is faulty. The human operator hears the noise and takes manual control to reduce the speed of the pump for the reason that the bearing is faulty. But since the bearing is not really faulty, this causes an unnecessary departure from the optimal trajectory. The modifications may then change the noise that the pump emits to no longer resemble the sound of a faulty bearing.

In a particularly advantageous embodiment, the likely reason for the override specifically comprises an overshoot and/or an undershoot of at least one state variable of the process. An overshoot may specifically comprise an increase of the state variable beyond a target value to which it is supposed to increase. Likewise, an undershoot may specifically comprise a decrease of the state variable beyond a target value to which it is supposed to decrease. If the state variable increases or decreases very rapidly for some time, this may create the impression on the side of the human operator that the state variable is moving out of control because of some fault. For example, a valve may be stuck in an open state, or a thermostat switch may be fused shut so that it fails to open.

The MPC knows the model of the process and thus knows the maximum slew rates with which the rate of increase or decrease of the state variable may be varied. Therefore, if the MPC deems it advantageous to increase or decrease the state variable to a new target value in order to conduct the process in an optimal manner according to the optimality criterion, it may perform the increase or the decrease at the maximum possible speed first and slow down at the last moment at which an overshoot or undershoot may still be avoided. In this manner, the new target value is reached as quickly as possible, and the overall time during which the process is conducted in an optimal manner as per the optimality criterion is maximized. But the human operator may not know the process model in as much detail as the MPC does, so he may suspect that something is wrong and the state variable is increasing or decreasing in an uncontrolled manner. Because the human operator will take more time to slow down the increase or decrease than the MPC; the human operator will have to make the decision to take manual control well before the time at which the MPC is planning to slow down the increase or decrease.

In situations like this, it is particularly advantageous to cause the rate at which the state variable of the process increases or decreases to progressively slow. In this manner, it takes longer for the state variable to reach its target value, but the varying rate makes it immediately apparent to the human operator that the process control is functional and actively doing something.

If a message is conveyed to the human operator, it may specifically comprise an explanation of the control strategy behind the to-be-applied control outputs. In the context of the figurative example portrayed above, such a message might read, "There is a forbidden zone in state space right ahead, and a left turn around this forbidden zone is prohibited as well. So I am making a right turn in order to get around the forbidden zone." Alternatively or in combination, the planned trajectory might be plotted, so as to assure the human operator that the MPC is aware of all constraints to be met and actually planning to meet them. The human operator then only needs to cursorily check whether the observed behavior is consistent with this explanation.

Alternatively or in combination, the message may specifically comprise an invitation to the human operator to choose one out of several candidate control strategies to be applied to the process. These control strategies may appear plausible to the human operator to a higher degree because less hard-to-grasp detours around said forbidden zones are necessary, at the expense of being less optimal in view of the given optimality criterion. But they still fare a lot better than a trajectory that would result from a manual intervention by the human operator.

In a particularly advantageous embodiment, the modifying that is performed in the course of the countermeasures specifically comprises generating multiple candidate sets of control outputs. Based on each candidate set of control outputs, the trained machine-learning model is queried again, so as to obtain a candidate classification value, and/or a candidate regression value. The candidate set of control outputs may yield a candidate classification value, and/or a candidate regression value, that indicates a lesser propensity of the human operator to override than for the current to-be-applied set of control outputs. If this is the case, the candidate set of control outputs becomes the new to-be-applied set of control outputs.

In this manner, an active search may be performed in the space of possible control outputs. The candidate sets of control outputs may be obtained by any suitable search strategy. The search strategy may, inter alia, depend on the time that is available for the search, and this time depends on the speed of the to-be-controlled industrial process. In most large-scale industrial processes, the time constants are long enough so that at least a few seconds may be allotted to the search.

In a further particularly advantageous embodiment, the determining a set of control outputs by the process controller may be performed by means of model predictive control, MPC. In MPC, a model of the industrial process is used to predict the evolution of state variables from a set of given values to a set of new candidate values in response to a given candidate set of control outputs being applied to the process. Multiple candidate sets of control outputs are tested in this manner, and based on at least one optimality criterion, a figure of merit is assigned to each of the candidate sets of state variables. At least one candidate set of state variables whose figure of merit meets a predetermined criterion is determined. The candidate set of control outputs corresponding to this candidate set of state variables is determined as the set of control outputs.

As discussed before, MPC does a particularly good job at circumventing said forbidden zones in state space, at the expense of the resulting trajectories being hard to understand for a human operator. By virtue of the countermeasures discussed before, the trajectories become easier to understand, and there is a lesser probability that the human operator will override the MPC.

Moreover, the MPC may be put to a second use in the active search for new candidate sets of control outputs detailed above. For example, constraints under which the MPC determines sets of output values may be modified in order to obtain new candidate sets of output values. For example, to avoid creating the impression of an impending overshoot of a state variable, a constraint for the maximum value of this state variable may be set to a lower value.

The invention also provides a method for training a machine-learning model for use in the control method described above.

In the course of the training method, during a real and/or simulated run of an industrial process under the control of a process controller and under the watch of a human operator, multiple sets of control outputs of the process controller are recorded. These control outputs are to be applied to at least one actor and/or lower-level controller. The actor, and/or the lower-level controller, is configured to cause the performing of at least one (real and/or simulated) physical action on the process.

For each of the multiple sets of control outputs delivered by the process controller, decisions whether the human operator requests to override this set of control outputs are recorded. For example, as long as the human operator lets the process run its automated course without intervening, decisions not to override the sets of control outputs delivered by the process controller may be recorded. Decisions to override may be recorded whenever the human operator somehow takes control.

Also, in each situation in which a set of control outputs is recorded, a set of current values and/or past values of state variables of the process is recorded. As discussed before, a set of control outputs is always tied to a situation of the process that is characterized by the set of current values and/or past values of state variables.

For each of the sets of control outputs in combination with the corresponding set of current values and/or past values of state variables, the machine-learning model is queried to obtain a classification value and/or a regression value. Parameters that characterize the behavior of the machine-learning model are optimized such that the classification value, and/or the regression value, more accurately predicts whether the human operator actually requested to override the respective set of control outputs.

That is, if it was recorded that the human operator let the process run its automated course when a certain set of control outputs was being applied, then the classification value, and/or the regression value, should indicate a low or zero propensity of the human operator overriding the control outputs. By contrast, if it was recorded that the human operator intervened when the particular set of control outputs was being applied, then the classification value, and/or the regression value, should indicate a high or certain propensity of the human operator overriding the control outputs.

Provided that the training is performed on a set of situations with a sufficiently high variability, the trained machine-learning model is then able to predict the propensity of the human operator overriding the control outputs in many more situations, even if those situations have not been part of the training. This is due to the power of generalization of such machine-learning models. To increase the variability, simulated runs of the industrial process are particularly advantageous because it is easy to provoke a wide range of situations. Also, runs of the industrial process may be performed with multiple independent human operators watching, so as to account for the variability between such operators. For example, one operator may react to a seemingly impending overshoot of a state variable earlier than another operator.

In a particularly advantageous embodiment, the method further comprises recording a reason for a request to override the set of control outputs. The parameters of the machine-learning model may then be optimized such that the classification value, and/or the regression value, also more accurately predicts this reason.

In a further particularly advantageous embodiment, the optimizing of the parameters comprises a first stage based on sets of control outputs and override decisions recorded on a first process, as well as a subsequent second stage based on sets of control outputs and override decisions recorded on a second process.

Specifically, the second stage may start with the values of the parameters that were obtained at the end of the first stage. In this manner, for example, a first stage of training that is performed on a more generic version of the industrial process may be re-used in multiple more specific instances of this process. Such re-using saves computation time. Also, it is not necessary to give away the training data that have gone into the first stage of training to anyone wishing to adapt the machine-learning model to a concrete implementation of the industrial process. Such training data may be confidential.

In a further particularly advantageous embodiment, a corrective control input by the human operator is recorded. A superposition of the set of control inputs that triggered the intervention by the human operator and the corrective control input that is part of this intervention is recorded as a new set of control outputs. A low or zero propensity for an override by the human operator is attributed to this new set of control outputs. The motivation for this is that by making a concrete quantitative control input, the human operator has explicitly indicated which values of the control outputs he/she deems to be acceptable in the situation at hand. In this manner, the set of training data may be augmented, so that the required variability may be achieved in a shorter period of time.

In a further particularly advantageous embodiment, all the sets of control outputs for which the human operator requests an override, and/or the corresponding sets of current values and/or past values of state variables of the process, are grouped into a plurality of clusters by means of a clustering algorithm. A different reason for the override is associated with each cluster.

In this manner, suitable classes for the classification by the machine-learning model may be determined automatically in a situation where it is not possible to set up the catalogue of possible classes, i.e., the catalogue of reasons why the human operator might want to override the MPC, using a priori knowledge. For example, it may not be known which types of behavior in the values of the state variables is most likely to trigger a human intervention. For example, the clustering may yield a first cluster of situations with the common feature that at least one state variable is steeply increasing. This cluster corresponds to a perceived impending overshoot as a reason for the override. The clustering may also yield a second cluster of situations with the common feature that at least one state variable is steeply decreasing. This cluster corresponds to a perceived impending undershoot as a reason for the override.

The main result of the training is the parameter set that characterizes the behavior of the trained machine-learning model. If the model comprises an artificial neural network, the parameters may, for example, comprise weights with which inputs to individual neurons are weighted when summing them to activations of the respective neurons. If the model comprises a support vector machine, the parameters may, for example, characterize hyperplanes that separate different classes from one another. In the parameter set, the effort of gathering the training data and the effort of the training itself are condensed. Whoever has the parameter set may skip the training and is immediately able to use the trained machine-learning model in the control method described above. Therefore, the parameter set is a product of its own that may be marketed separately.

The machine-learning model may also be extended to comprise further quantities that characterize the situation to which each set of control outputs corresponds. For example, on top of the set of current values and/or past values of state variables of the process, at least one set-point of the process, and/or a future expectation of at least one state variable of the process, may also be used to characterize the situation of the process.

The invention may be at least partially implemented in a computer program that may be sold separately. The invention therefore also provides a computer program with machine-readable instructions that, when executed by one or more computers, cause the one or more computers to perform the control method, and/or the training method, described above.

Specifically, the computer program, and/or the parameter set, may be marketed and delivered in the form of a non-transitory storage medium, and/or in the form of a downloadable product. A computer may be provisioned with the parameter set, with the computer program, and/or with the non-transitory storage medium.

FIG. 1 is a flow chart of an exemplary embodiment of the control method 100. In step 110, based on a set 11 of current values and/or past values of state variables of the process 1, a set 21 of control outputs is determined by a process controller 2. In the example shown in FIG. 1, the process controller 2 performs model predictive control, MPC: According to block 111, for multiple candidate sets 21a-21c of control outputs, the evolution of a given set 11 of values of state variables to candidate sets 11a-11c that will happen when the respective candidate sets 21a-21c of control outputs being applied to the process 1. According to block 112, based on an optimality criterion 24, each of the candidate sets 11a-11c of state variables is assigned a respective figure of merit 25a-25c. According to block 113, based on this figure of merit 25a-25c, one candidate set 21a-21c of control outputs is selected as the final set 21 of control outputs. This set 21 of control outputs is to be applied to the process 1, e.g., to an actor 12 or to a lower-level controller 13 of this process.

In step 120, the set 11 of state variables and the set 21 of control outputs are passed to the trained machine-learning model 3 that returns a classification value 31, and/or a regression value 32, and/or a likely reason 34 why a human operator 4 wishes to override the set 21 of control outputs. The propensity 33 of the human operator 4 overriding these control outputs 21 may be directly contained in the output from the machine-learning model 3, or it may be computed from the classification value 31, and/or from the regression value 32.

It is then determined whether the classification value 31, and/or the regression value 32, and/or the propensity 33, meets the predetermined criterion 130. If this is the case (truth value 1), then there are two options that may be performed alternatively or in combination.

In step 140, at least one of the control outputs 21, and/or at least one parameter 22 that characterizes the behavior of the process controller 2, and/or at least one constraint 23 under which the process controller 2 operates, is modified with the goal of reducing the propensity 33 of the human operator overriding the control outputs 21. The modification is performed before the set 21 of control outputs is applied to the process 1. Specifically, where the process controller 2 is an MPC controller whose internal structure may be unknown, altering the constraints 22 of the MPC and then re-running the MPC is the preferred way of obtaining an updated set 21 of control outputs.

Inside box 140, exemplary ways of performing the modification are sketched. According to block 141, the rate at which a state variable increases or decreases may be progressively slowed, so as not to create the impression on the side of the human operator 4 that this state variable is varying in an uncontrolled manner.

According to blocks 142 to 144, an active search may be performed for a new set 21 of control outputs. According to block 142, multiple candidate sets 21a-21c of control outputs may be generated. For example, the MPC process controller 2 may be used as a source of such candidate sets 21a-21c. According to block 143, the trained machine-learning model 3 may be queried again based on the set 11 of state variables and the candidate set 21a-21c of control outputs, so as to obtain a candidate classification value 31a-31c, and/or a candidate regression value 32a-32c. Based on this output from the trained machine-learning model 3, according to block 144, a candidate set 21a-21c for which the propensity 33 of the human operator intervening is selected as the new set 21 of control outputs.

In step 150, a message 41 is conveyed to the human operator 4, so as to convince this human operator 4 that the to-be-applied set 21 of control outputs is plausible in view of the current situation of the process 1 as described by the set 11 of state variables. Specifically, the message 41 may contain an explanation 41a of the control strategy 2a behind the to-be-applied control outputs 21, and/or an invitation 41b to choose one out of several candidate control strategies 2a to be applied to the process 1.

Figure 2:
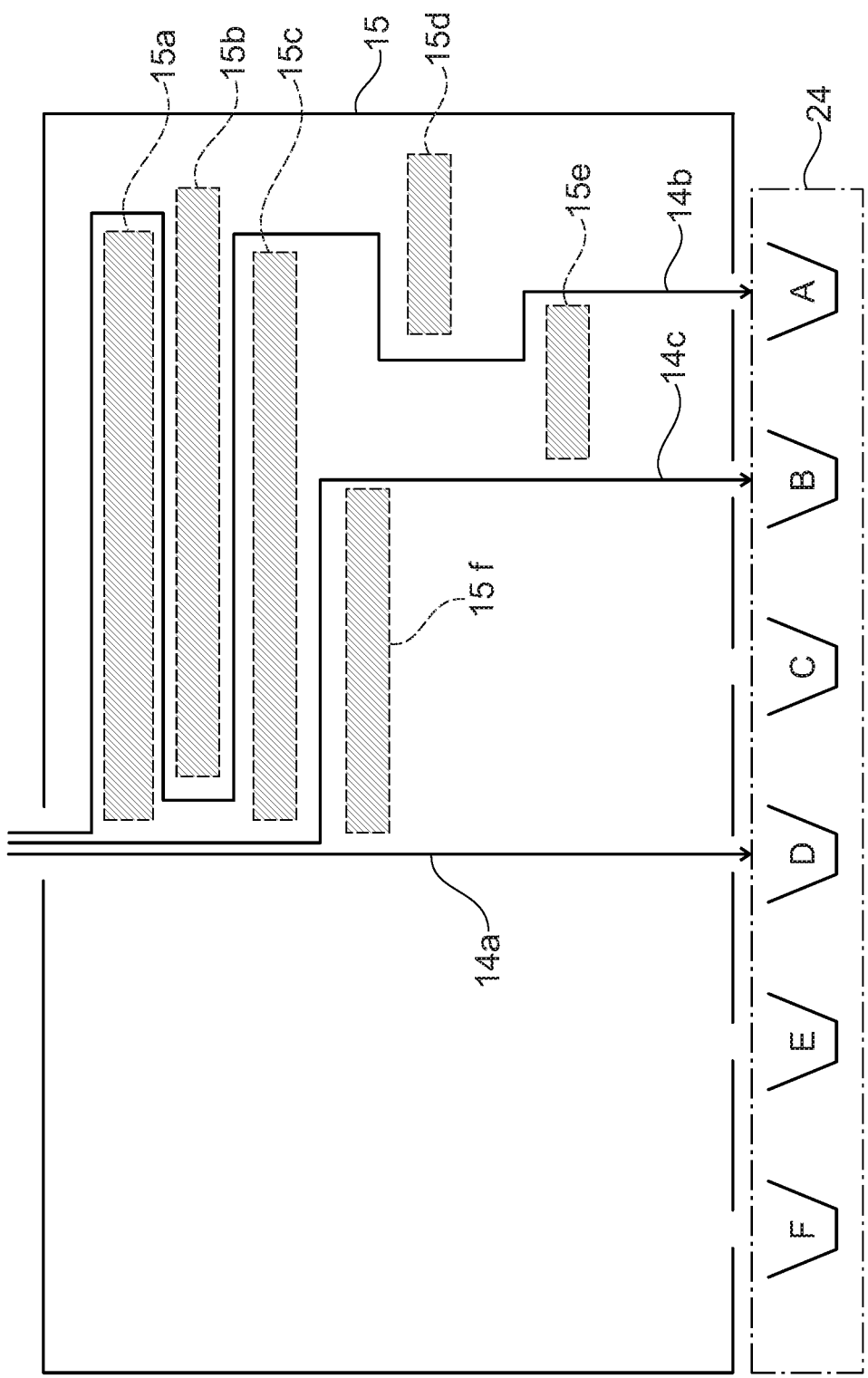
FIG. 2: Schematic illustration of the trade-off between optimality and understandability of trajectories in the state space.

FIG. 2 illustrates the trade-off between optimality and understandability of control outputs 21 on a toy example. When a set 21 of control outputs is applied to the process 1, this will cause the process 1 to follow some trajectory 14a-14c in state space 15. The process controller 2 works according to an optimality criterion 24 that rates the trajectories 14a-14c. In the toy example of FIG. 2, the rating is a school grade that goes down from A to F.

The reason why there is a trade-off between optimality and understandability lies in the complexity of the physical process 1. This complexity is sketched in the form of forbidden zones 15a-15f in state space 15 that the trajectories 14a-14c cannot enter or cross. The better the rating of the trajectory 14a-14c is, the more complex the required path around the forbidden zones 15a-15f is. A more complex trajectory 14a-14c in turn requires a more complicated pattern of control outputs 21 to produce.

In the toy example, there is one easily understandable, straight-forward trajectory 14a. But this trajectory is only rated with a grade of D by optimality criterion 24. The optimal trajectory 14b that achieves a grade of A, on the other hand, is extremely complex and takes many detours around the forbidden zones 15a-15e in state space 15. Since the forbidden zones 15a-15f in state space 15 are part of the process model in the MPC process controller 2, they are invisible to the human operator 4, who may well be puzzled by the circuitous trajectory 14b and suspect that something is wrong. The human operator 4 may thus take manual control and conduct the process 1 along the straight-forward trajectory 14a, swapping a grade of A for a grade of D.

In this situation, it is worthwhile to switch to the trajectory 14c. This trajectory 14c makes only one detour around forbidden zone 15f in state space 15, so it is much more likely to be accepted as plausible by the human operator 4 than the optimal trajectory 14b. To achieve this, the grade of A that the optimal trajectory 14b would have achieved needs to be traded in for a grade of B, which is a much smaller price to pay than falling back to a grade of D.

Figure 3:
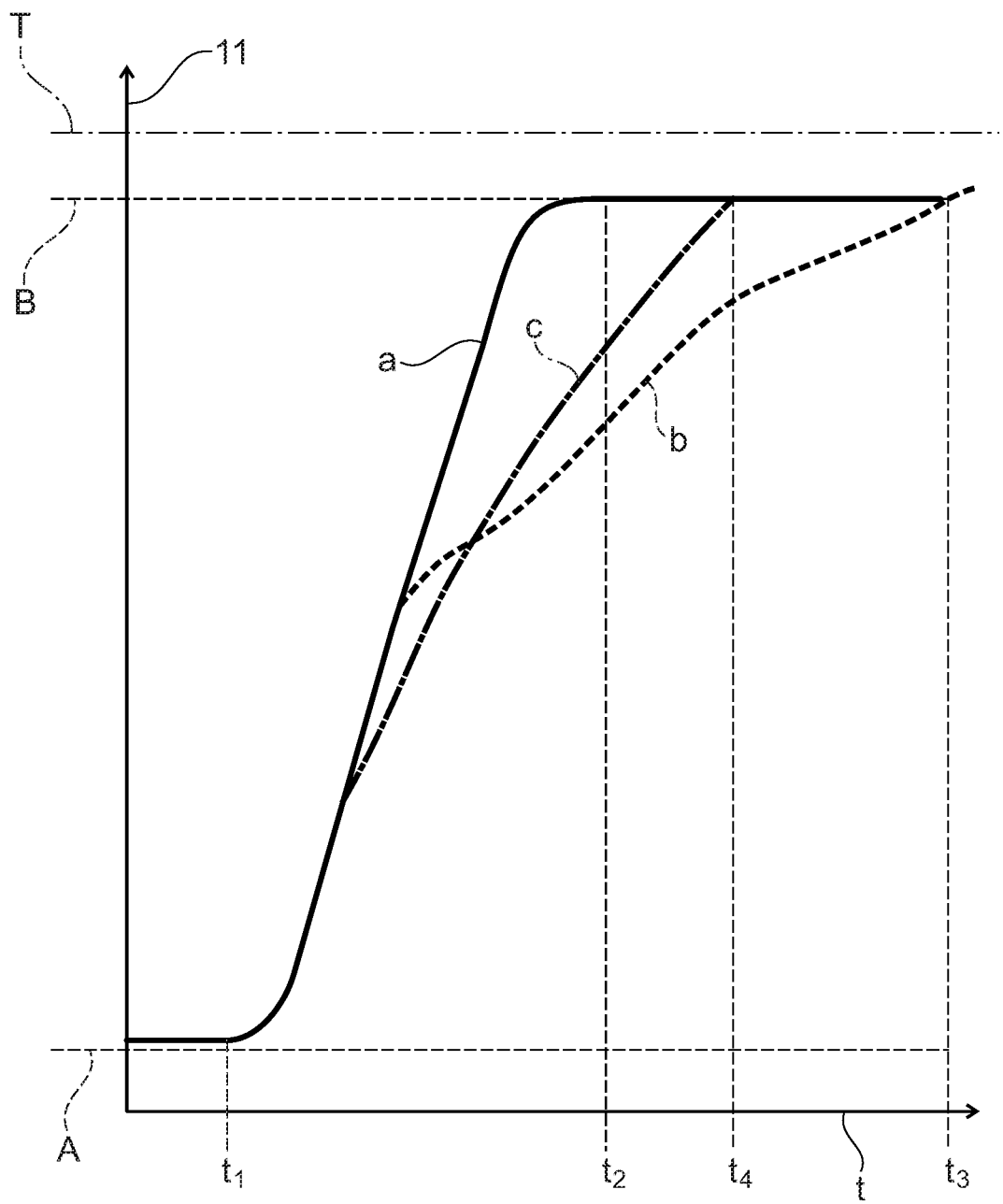
FIG. 3: Avoiding the impression that an increase of a state variable 11 from target value A to target value B will overshoot over a constraint threshold T.

FIG. 3 is another example of a situation that is likely to trigger intervention by the human operator 4. A state variable 11 of the process 1 is to be increased from a first target value A to a second target value B because the MPC controller 2 deems this to be worthwhile according to its optimality criterion. The second target value B is quite close to the constraint threshold T that must not be exceeded. The increase of the state variable 11 is brought about by control outputs 21 that are not shown in FIG. 3 for clarity.

Starting from the first target value A at time $t_1$, the fastest way to reach the second target value B is to accelerate the increase of the state variable 11 to its maximum possible rate, and slow down at the last possible moment (trajectory a). If this strategy is followed, the second target value B is reached at time $t_2$.

However, the aggressive increase of the state variable 11 may come as a surprise to the human operator 4. Fearing that an overshoot over the constraint threshold T is imminent, the human operator 4 may take manual control, depart from the optimal trajectory a and guide the state variable 11 towards the second target value B along trajectory b. This very cautious approach comes at the price that the trajectory b reaches the second target value B much later, at time $t_3$. This means that the process 1 is running sub-optimally between times $t_2$ and $t_3$.

The propensity of the human operator 4 overriding the MPC controller 2 can be reduced by progressively reducing the speed at which the state variable 11 increases. That is, after a very short time of increase at the maximum rate, the state variable 11 is guided along trajectory c. This trajectory c involves a departure from the optimal trajectory a as well, and it reaches the second target value B at time $t_4$, which is again later than $t_2$. But it is still a lot earlier than time $t_3$. Furthermore, the process 1 remains under automatic control, so there is no danger of the human operator 4 making a mistake and causing the very overshoot that the intervention was meant to avoid.

Figure 4:
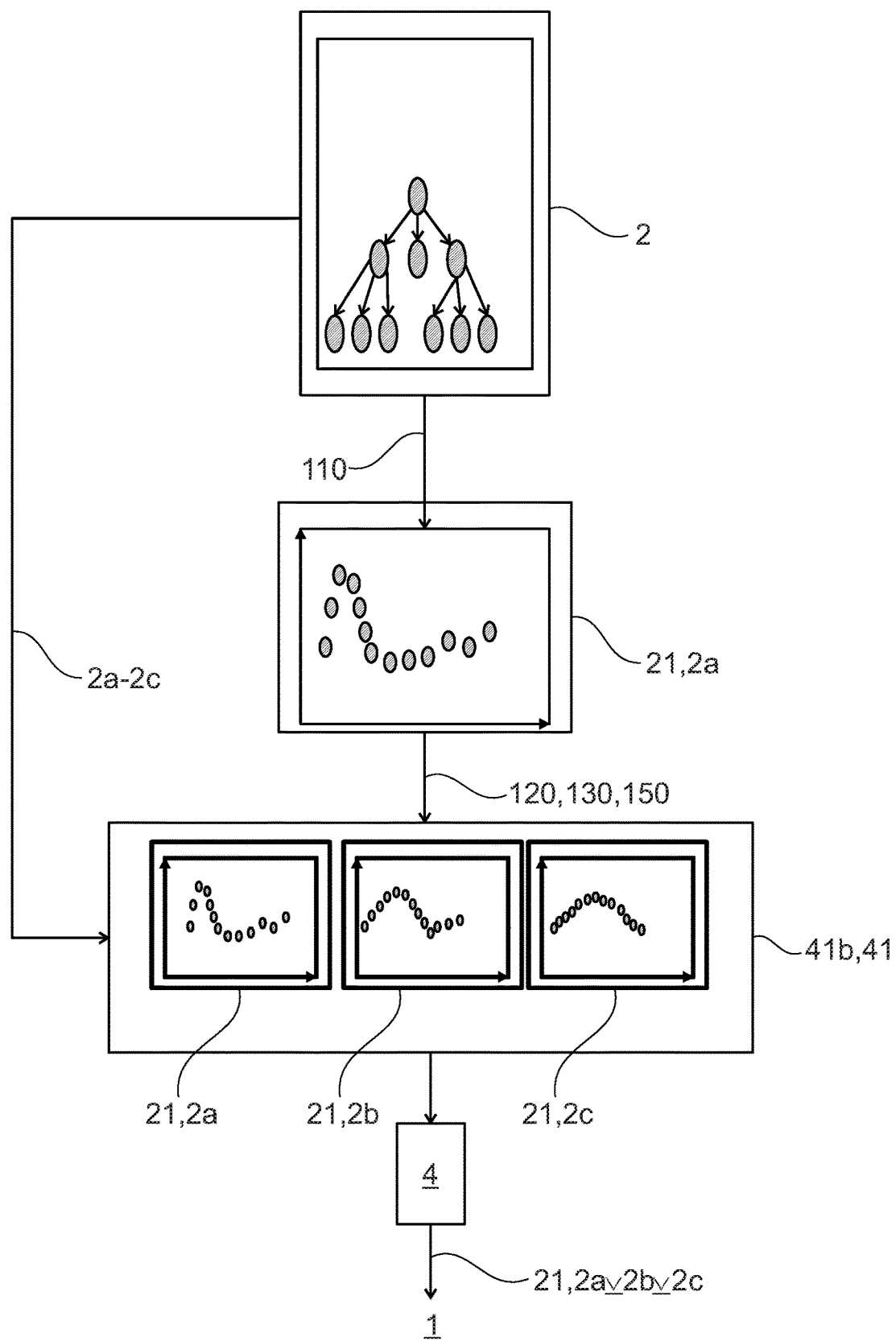
FIG. 4: Schematic illustration of an embodiment where the human operator 4 is to select a control strategy $2a$-$2c$.

FIG. 4 illustrates the interactive approach that prompts the human operator 4 to select one of several proposed control strategies 2a-2c. Initially, the MPC process controller 2 produces a set 21 of control outputs in the course of step 110 of method 100. This set 21 of control outputs corresponds to a first control strategy 2a.

In the course of steps 120 and 130, it is determined that the propensity 33 of the human operator 4 overriding the set 21 of control outputs is too high. Therefore, it is decided to prompt the human operator 4 with a message 41, 41b. To this end, further control strategies 2b, 2c are obtained from the MPC process controller 2. These further control strategies 2b, 2c are sub-optimal with respect to the optimality criterion 24, but they are more easily understood by the human operator 4, so there is a higher chance that they will be deemed plausible. The human operator 4 is prompted to select exactly one of the proposed control strategies 2a-2c with corresponding set 21 of control outputs. The selected set 21 of control outputs is applied to the process 1.

Figure 5:
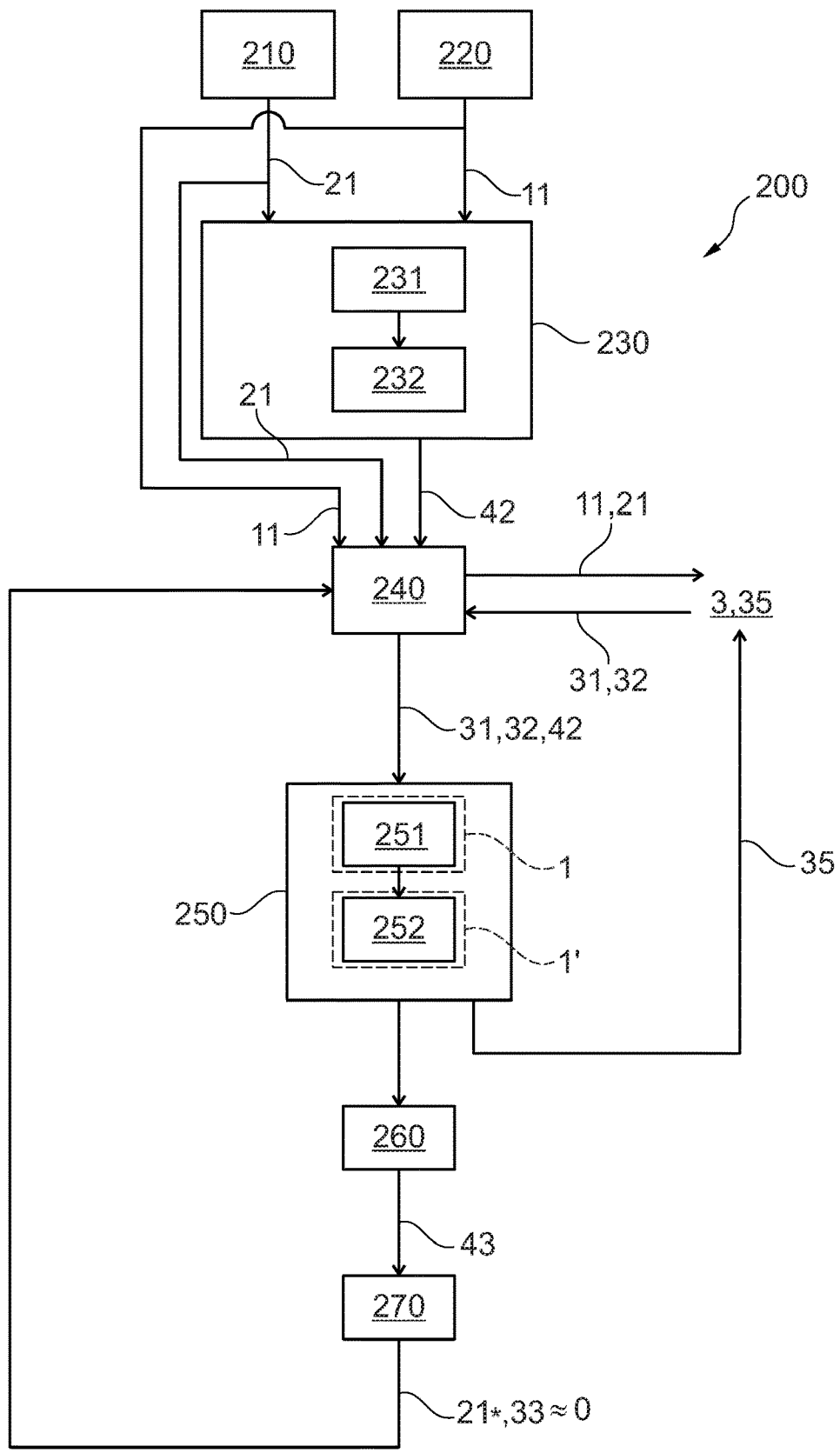
FIG. 5: Exemplary embodiment of the training method 200.

FIG. 5 is a flow chart of an exemplary embodiment of the training method 200. In step 210 of the method 100, during a real and/or simulated run of the process 1 under the control of the process controller 2, multiple sets 21 of control outputs from the process controller 2 are recorded. Also, in step 220, the set 11 of current values and/or past values of state variables of the process 1, on which the respective set 21 of control outputs is based, is recorded.

In step 230, for each of the multiple sets 21 of control outputs delivered by the process controller, decisions 42 whether the human operator 4 requests to override the respective set 21 of control outputs in the respective situation are recorded. According to block 231, this may comprise grouping all the sets 21 of control outputs for which the human operator 4 requests an override, and/or the corresponding sets (11) of current values and/or past values of state variables of the process, into a plurality of clusters by means of a clustering algorithm. A different reason 34 for the override is associated with each cluster. For example, one cluster may relate to situations where the human operator 4 feared an overshoot of a state variable, and another cluster may relate to situations where the human operator 4 feared an undershoot of a state variable.

In step 240, the machine-learning model 3 that is being trained is queried with a set 21 of control outputs and the corresponding set 11 of state variables that describes the situation for which the control outputs are meant. The behavior of the machine-learning model is characterized by a set of parameters 35. The machine-learning model returns a classification value 31, and/or a regression value 32, from which the propensity 33 of the human operator 4 overriding the set 21 of control outputs follows.

In step 250, the parameters 35 are optimized such that this prediction of the propensity 33 based on the classification value 31 and/or based on the regression value 32 is made more accurate, that is, better matches the actual decisions 42. This optimization may be performed in two stages 251 and 252 on different processes 1 and 1', respectively. The resulting parameters 35 are applied to the machine-learning model 3.

In step 260, a corrective control input 43 by the human operator 4 is recorded. In step 270, a superposition of the set 21 of control inputs that was not deemed to be plausible by the human operator and the corrective control input 43 that the human operator 4 applied in response to this determination is recorded as a new set 21* of control outputs. For this new set 21* of control outputs, it is known that there is a low or zero propensity 33 for an override by the human operator 4. The new set 21* may be used in steps 240 and 250 like any other set 21 of control outputs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1, 1' industrial processes
11 set of state variables of process 1
11a-11c candidate sets 11 of state variables
12 actor in process 1
13 lower-level controller in process 1
14a-14c trajectories in state space 15
15 state space of process 1
15a-15f forbidden zones in state space 15
2 process controller
2a-2c control strategies
21 set of control outputs
21a-21c candidate sets of control outputs
22 parameter, characterized behavior of process controller 2
23 constraint under which process controller 2 operates
24 optimality criterion for process controller 2
25a-25c figures of merit according to optimality criterion 24
3 machine-learning model
31 classification value supplied by model 3
31a-31c classification values for candidate sets 21a-21c
32 regression value supplied by model 3
32a-32c regression values for candidate sets 21a-21c
33 propensity for human operator 4 overriding set 21 of outputs
34 reason for overriding
35 parameters, characterize behavior of machine-learning model 3
4 human operator
41 message to human operator 4
41a explanation of control strategy 2a-2c
41b invitation to select control strategy 2a-2c
42 decision by human operator 4
43 corrective control input by human operator 4
100 control method
110 determining set of control outputs 111 predicting candidate sets 11a-11c of state variables
112 assigning figure of merit 25a-25c to candidate sets 11a-11c
113 selecting candidate set 21a-21c as set 21 of control outputs
120 querying trained machine-learning model 3
130 criterion for classification 31, regression 32, and/or propensity 33
140 modifying control outputs 21, parameters 22, and/or constraint 23
141 progressively slowing increase/decrease rate of state variable
142 generating multiple candidate sets 21a-21c
143 querying trained machine-learning model 3
144 replacing control outputs with selected candidate set 21a-21c
150 conveying message to human operator 4
200 training method
210 recording multiple sets 21 of control outputs
220 recording sets 11 of state variable values
230 recording decisions 42
231 clustering cases for which an override is requested
232 attributing different reasons 34 to different clusters
240 querying machine-learning model 3
250 optimizing parameters 35 of model 3
251 first stage of optimizing 250 on first process 1
252 second stage of optimizing 250 on second process 1
260 recording corrective control input 43
270 recording new set 21* of control outputs using control input 43
A first target value for state variable 11
B second target value for state variable 11
T constraint threshold for state variable 11
t time
$t_1$-$t_4$ points in time

What is claimed is:

1. A method for controlling an industrial process, comprising:
    determining, by a process controller, based at least in part on a set of current values and/or past values of state variables of the industrial process, a set of control outputs to be applied to at least one actor and/or lower-level controller configured to cause a performing of at least one physical action on the process;
    querying, based on at least a subset of the set of current values and/or past values of state variables and on at least a subset of the set of control outputs, a trained machine-learning model that is configured to output a classification value, and/or a regression value, that is indicative of a propensity of a watching human operator to at least partially override the control outputs delivered by the process controller, wherein the classification value, and/or the regression value, comprises a likely reason for the human operator to override the control outputs delivered by the process controller, and wherein the likely reason comprises an overshoot and/or an undershoot of at least one state variable of the process; and
    in response to determining that the classification value, and/or the regression value, and/or the propensity of the human operator overriding the control outputs, meets a predetermined criterion:
        modifying at least one of the control outputs, and/or at least one parameter that characterizes a behavior of the process controller, and/or at least one constraint under which the process controller operates, wherein the modifying comprises: causing a rate at which the specific state variable of the process increases or decreases to progressively slow, and wherein the modifying is targeted at reducing a prevalence of the likely reason in the behavior of the process, and/or
        conveying at least one message to the human operator, with a goal of reducing the propensity.

2. The method of claim 1, wherein the message comprises:
    an explanation of a control strategy behind to-be-applied control outputs; and/or
    an invitation to the human operator to choose one out of several candidate control strategies to be applied to the industrial process.

3. The method of claim 1, wherein the modifying comprises:
    generating multiple candidate sets of control outputs;
    querying, based on each candidate set of control outputs, the trained machine-learning model, so as to obtain a candidate classification value, and/or a candidate regression value; and
    replacing a current to-be-applied set of control outputs with a candidate set of control outputs for which the corresponding candidate classification, and/or candidate regression, indicates a lesser propensity of the human operator to override.

4. The method of claim 1, wherein the machine-learning model further bases the classification value, and/or the regression value, on at least one set-point of the process, and/or on a future expectation of at least one state variable of the process.

5. The method of claim 1, wherein the machine-learning model comprises an artificial neural network and/or a support vector machine.

6. A computer program comprising machine-readable instructions that, when executed by one or more computers, cause the one or more computers to perform the method of claim 1.

7. A non-transitory storage medium and/or a downloadable product, comprising the computer program of claim 6.

8. A computer, provisioned with the computer program of claim 6.

9. A method for controlling an industrial process, comprising:
    determining, by a process controller, based at least in part on a set of current values and/or past values of state variables of the industrial process, a set of control outputs to be applied to at least one actor and/or lower-level controller configured to cause a performing of at least one physical action on the process, wherein determining the set of control outputs comprises:
        predicting, based on a model of the industrial process, for multiple candidate sets of control outputs, candidate sets of values of state variables to which a given set of values of state variables will evolve in response to a respective set of candidate control outputs being applied to the at least one actor and/or lower-level controller;
        assigning, based on at least one optimality criterion, a figure of merit to each of the candidate sets of state variables; and
        determining a candidate set of control outputs corresponding to a candidate set of state variables whose figure of merit meets a predetermined criterion as the set of control outputs;
    querying, based on at least a subset of the set of current values and/or past values of state variables and on at least a subset of the set of control outputs, a trained machine-learning model that is configured to output a classification value, and/or a regression value, that is indicative of a propensity of a watching human operator to at least partially override the control outputs delivered by the process controller; and in response to determining that the classification value, and/or the regression value, and/or the propensity of the human operator overriding the control outputs, meets a predetermined criterion:

modifying at least one of the control outputs, and/or at least one parameter that characterizes a behavior of the process controller, and/or at least one constraint under which the process controller operates, and/or conveying at least one message to the human operator, with a goal of reducing the propensity.

10. A method for training a machine-learning model for use in a method for controlling an industrial process, the method for controlling an industrial process comprising: determining, by a process controller, based at least in part on a set of current values and/or past values of state variables of the industrial process, a set of control outputs to be applied to at least one actor and/or lower-level controller configured to cause a performing of at least one physical action on the process; querying, based on at least a subset of the set of current values and/or past values of state variables and on at least a subset of the set of control outputs, the trained machine-learning model that is configured to output a classification value, and/or a regression value, that is indicative of a propensity of a watching human operator to at least partially override the control outputs delivered by the process controller; and in response to determining that the classification value, and/or the regression value, and/or the propensity of the human operator overriding the control outputs, meets a predetermined criterion: modifying at least one of the control outputs, and/or at least one parameter that characterizes a behavior of the process controller, and/or at least one constraint under which the process controller operates, and/or conveying at least one message to the human operator, with a goal of reducing the propensity, the method for training the machine-learning model comprising:

recording, during a real and/or simulated run of an industrial process under the control of a process controller and under the watch of a human operator, multiple sets of control outputs from the process controller to be applied to at least one actor and/or lower-level controller configured to cause a performing of at least one physical action on the process;

recording a set of current values and/or past values of state variables of the industrial process in each situation in which a set of control outputs is recorded;

recording, for each of the multiple sets of control outputs delivered by the process controller, decisions whether the human operator requests to override the set of control outputs;

querying, based on each of the sets of control outputs and a corresponding set of current values and/or past values of state variables of the process, the machine-learning model to obtain a classification value and/or a regression value; and optimizing parameters that characterize a behavior of the machine-learning model such that the classification value, and/or the regression value, more accurately predicts whether the human operator actually requested to override the respective set of control outputs.

11. The method of claim 10, further comprising:

recording a reason for a request to override the set of control outputs; and optimizing the parameters such that the classification value, and/or the regression value, more accurately predicts the reason.

12. The method of claim 10, wherein the optimizing of the parameters comprises:

a first stage based on sets of control outputs and override decisions recorded on a first process; and a subsequent second stage based on sets of control outputs and override decisions recorded on a second process.

13. The method of claim 10, further comprising:

recording a corrective control input by the human operator; and recording a superposition of the set of control outputs with the corrective control input as a new set of control outputs that has a low or zero propensity for an override by the human operator.

14. The method of claim 10, further comprising:

grouping all sets of control outputs for which the human operator requests an override, and/or corresponding sets of current values and/or past values of state variables of the industrial process, into a plurality of clusters by a clustering algorithm; and associating a different reason for the override with each cluster.

15. A parameter set with parameters that characterize the behavior of a machine-learning model, obtained by the method of claim 10.

16. A non-transitory storage medium and/or a downloadable product, comprising the parameter set of claim 15.

17. A computer, provisioned with the non-transitory storage medium and/or downloadable product of claim 16.

18. A computer, provisioned with the parameter set of claim 15.

* * * * *